United States Patent [19]

Nelson et al.

[11] 3,876,991

[45] Apr. 8, 1975

[54] DUAL THRESHOLD, THREE TRANSISTOR DYNAMIC MEMORY CELL

[75] Inventors: James Thomas Nelson, Coopersburg; Walter Rosenzweig, Allentown, both of Pa.

[73] Assignee: Bell Telephone Laboratories, Incorporated, Murray Hill, N.J.

[22] Filed: July 11, 1973

[21] Appl. No.: 378,052

[52] U.S. Cl. .............. 340/173 R; 307/238; 307/246; 307/304; 340/173 CA

[51] Int. Cl. ........................ G11c 11/40; G11c 11/24

[58] Field of Search ................. 340/173 R, 173 CA; 307/238, 279, 246, 304

[56] References Cited

UNITED STATES PATENTS

| | | | |
|---|---|---|---|
| 3,765,000 | 10/1973 | Regitz | 340/173 CA |
| 3,774,177 | 11/1973 | Schaffer | 340/173 R |

OTHER PUBLICATIONS

Terman, FET Memory Systems, IEEE Transactions on Magnetics, Vol. Mag – 6, No. 3, 9/70, pp. 584–589, S1457 0017.

*Primary Examiner*—Stuart N. Hecker

*Attorney, Agent, or Firm*—Donnie E. Snedeker

[57] ABSTRACT

Single select line, three transistor dynamic memory cells require precise control of the trilevel select line voltage to insure that only the intended state is selected. Typically, one transistor is associated with a write state; a second transistor, with a read state; and a third transistor, with the storage function. A dual threshold dynamic memory cell, wherein the threshold voltage of the write transistor is substantially different than the threshold voltage of the read transistor, significantly relaxes the precise select voltage control requirement. The different threshold voltages can be provided at the time of manufacture by using conventional techniques, such as selective ion implantation or selective gate oxidation.

9 Claims, 1 Drawing Figure

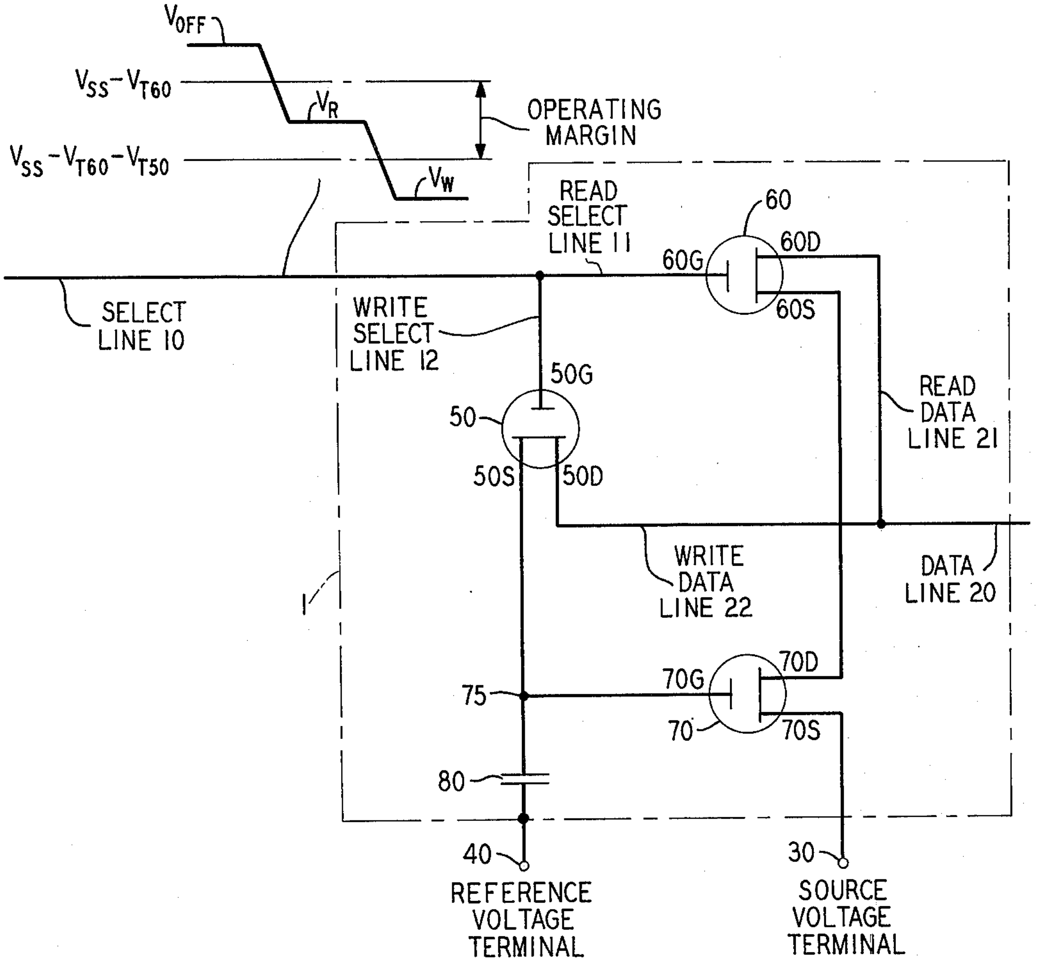
V_OFF
V_SS-V_T60
V_R
V_SS-V_T60-V_T50
V_W
OPERATING MARGIN
READ SELECT LINE 11
60
60D
60G
60S
SELECT LINE 10
WRITE SELECT LINE 12
50G
50
50S
50D
READ DATA LINE 21
WRITE DATA LINE 22
DATA LINE 20
1
70D
70G
75
70
70S
80
40
30
REFERENCE VOLTAGE TERMINAL
SOURCE VOLTAGE TERMINAL

DUAL THRESHOLD, THREE TRANSISTOR DYNAMIC MEMORY CELL

BACKGROUND OF THE INVENTION

This invention relates to semiconductor memory cells, and more particularly, to three transistors dynamic memory cells using a single select line to which an external source supplies a voltage for selecting an OFF state, a read state, or a write state.

The performance advantages provided by semiconductor memories have been espoused by memory designers for some time. Particularly promising among semiconductor memory cells are dynamic memory cells comprising three transistors, respectively associated with the write state, the read state, and the storage function. Commonly, a three transistor dynamic memory cell employs four lines connected to external apparatus: a write select line, a read select line, a write data line, and a read data line. It is known to combine the write select line and the read select line into a single select line and to use a trilevel signal to drive that single select line. The first signal level selects the OFF state; the second signal level, the read state; and the third signal level, the write state.

An inherent problem with the single select line configuration is that the amplitude of the signal applied to select the read state; i.e., the second, or intermediate, signal level; must usually be carefully controlled in order that only the read state is chosen. Absent such control, the stored data may be overwritten. The small operating margin, which gives rise to the criticality of control, typically results because the select line is jointly connected to the control electrodes of both the read and write transistors. Further, the small operating margin does not permit significant overdrive of the read state select signal voltage, thereby tending to increase the memory cell access time.

Accordingly, it is an object of this invention to lessen the critical control demands placed upon the external select line signal supply.

It is a further object of this invention to increase the operating margin for the intermediate select line signal.

A still further object of this invention is to permit an increase in the overdrive voltage applied to the control electrodes of the read and write transistors.

A further object of this invention is to decrease the semiconductor memory cell access time.

Still further, it is an object of this invention to prevent untoward loss of the information stored in the memory cell.

SUMMARY OF THE INVENTION

According to our invention, the above and other objects are achieved in a single select line, three transistor dynamic memory cell by providing the write transistor with a threshold voltage different than the threshold voltage of the read transistor. The different threshold voltages can be provided at the time of manufacture by using conventional techniques, such as selective ion implantation or selective gate oxidation.

Further and more pointedly, since the operating margin of the memory cell is equal to the threshold voltage of the write transistor, our invention includes making the threshold voltage of the write transistor greater than that of the read transistor, which permits relaxation of any precision requirements placed upon the externally supplied select line signals. The greater operating margin also permits larger overdrive voltage on the select line with an attendant decrease in memory cell access time and further prevents unwanted loss of the stored information.

BRIEF DESCRIPTION OF THE DRAWING

The invention should become more apparent from the following detailed description when taken in conjunction with the accompanying drawing which shows an illustrative semiconductor memory cell in accordance with the principles of the present invention.

DETAILED DESCRIPTION

The present invention relates to a three transistor dynamic memory cell of the known type in which the read select line and the write select line are combined into a single select line. The read and write data lines may also be combined into a single data line, or the two data lines may be separate and noncombined, as desired for the particular memory cell application. For brevity and for descriptive purposes herein, the illustrative embodiment in the drawing shows the read and write data lines combined into a single data line.

The three transistor dynamic memory cell 1 in the drawing thus includes write transistor 50, read transistor 60, storage transistor 70, select line 10, read select line 11, write select line 12, data line 20, read data line 21, write data line 22, source voltage terminal 30, and reference voltage terminal 40. Control electrode 60G of transistor 60 is connected to read select line 11. Control electrode 50G of transistor 50 is connected to write select line 12. Read select line 11 and write select line 12 are jointly connected to select line 10. Drain electrode 60D of transistor 60 is connected to read data line 21. Drain electrode 50D of transistor 50 is connected to write data line 22. Read data line 21 and write data line 22 are jointly connected to data line 20. Source electrode 60S of transistor 60 is connected to drain electrode 70D of transistor 70. Source electrode 70S of transistor 70 is connected to source voltage terminal 30. Control electrode 70G of transistor 70 and source electrode 50S of transistor 50 are jointly connected at storage node 75. Capacitance 80 is the lumped parasitic capacitance between storage node 75 and the substrate supporting the memory cell 1, the substrate typically residing at the voltage supplied to reference voltage terminal 40 by being connected thereto, as depicted in the drawing.

Information is stored in the memory cell in the form of a voltage across capacitance 80, or, stated alternatively, in the form of a charge on capacitance 80. Therefore, herein, the information is said to be stored at storage node 75. The voltage representative of logic one is normally equal in magnitude to the voltage supplied to reference voltage terminal 40. The voltage representative of logic zero is normally equal in magnitude to the voltage supplied to source voltage terminal 30.

The interconnective structure in the drawing is similar to that shown in U.S. Pat. No. 3,706,079 issued to Leslie L. Vadasz and Joel A. Karp on Dec. 12, 1972 and entitled, "Three-Line Cell for Random-Access Integrated Circuit Memory." A single select line memory cell employing noncombined read and write data lines is disclosed in the article by William M. Regitz and Joel A. Karp, "Three-Transistor-Cell 1024-Bit 500-ns MOS RAM," *IEEE Journal of Solid-State Circuits*, Vol SC-5, No. 5 (October 1970), pp 181–186.

As an aid in understanding how our invention solves certain problems encountered by the prior art, some illustrative state-of-the-art relationships and assumptions are employed in the following exposition.

Positive logic, with ground as the reference voltage, is assumed in a P-channel field effect transistor (FET) embodiment using 16 volts as the source voltage. Each FET has a turn-on voltage, which is defined as the control electrode voltage required to create a conducting channel between its source and drain electrodes. The turn-on voltage for current state-of-the-art devices is about one-tenth to one-fifth less than the magnitude of the source-to-drain voltage. This positive difference between the source-to-drain voltage and the turn-on voltage is called the threshold voltage of the FET. In known memory cells, the three FETs each have substantially the same threshold voltage, representatively, in the order of 1.6 volts. Herein, the symbol $V_{T50}$ is used to represent the threshold voltage of transistor 50 and $V_{T60}$, transistor 60.

As depicted in the drawing, the relationship among the three levels of the select line signal is commonly such that the OFF state potential is a positive potential $V_{OFF}$, which exceeds the read state voltage $V_R$, which, in turn, exceeds the write state voltage $V_W$. If the voltage supplied to source voltage terminal 30 is represented as $V_{SS}$, the magnitude of the OFF state voltage is large enough so that $V_{OFF} > V_{SS} - V_{T60}$. In typical embodiments of magnitude of $V_{OFF}$ is usually $V_{SS}$. The magnitude of the read state voltage is large enough so that $V_R > V_{SS} - V_{T60} - V_{T50}$. The difference between the OFF and the read state voltage boundary and the read and the write state voltage boundary is called the operating margin, which in magnitude, is, therefore, $V_{T50}$. The magnitude of the write state voltage $V_W$ is commonly the magnitude of the voltage supplied to reference voltage terminal 40, but can be any voltage so that $V_W \leq V_{SS} - V_{T60} - V_{T50}$.

The OFF state is selected when a voltage $V_{OFF}$ is applied to select line 10 so that neither transistor 50 nor transistor 60 conduct. Data line 20 is, therefore, logically in a "don't care" state.

To write information into the dynamic memory cell, a voltage representing the logic state of the information bit to be stored, also called the write data, is placed on data line 20. At substantially the same time as the write data is supplied to data line 20, voltage $V_W$ is supplied to select line 10. Thereby both transistors 50 and 60 are rendered conducting. Independent of the conductive state of transistor 70, the external source, which supplied the write data to data line 20, controls the magnitude of the signal thereon. Since transistor 50 is conducting, the substantial equivalent of the voltage supplied to data line 20 will appear at storage node 75.

During the read cycle, the information stored at storage node 75 is read out in inverted form. If required, known external circuitry may be connected to the memory cell to reinvert the data, e.g., an inverter transistor with its control electrode connected to read data line 21, its source electrode connected to source voltage terminal 30, and read out data provided at its drain electrode. When read voltage $V_R$ is applied to select line 10, transistor 60 conducts. The read cycle differs for each of the two representative states of charge on capacitance 80. In either case, however, at substantially the same time as $V_R$ is applied to select line 10, a voltage is supplied by an external source to data line 20 to precharge data line 20 to the logic one state.

If a logic zero had been stored in the memory cell, the logic zero voltage appearing at control electrode 70G prohibits transistor 70 from conducting. Therefore, absent a conducting path through the memory cell, the voltage supplied to precharge data line 20 to the logic one state, remains thereon. Thus, the memory cell inverts the logic zero stored at storage node 75 to a logic one. Since voltage $V_R$ also appears at control electrode 50G, transistor 50 may partly conduct. If transistor 50 even partly conducts, an incorrect read operation may occur. Specifically, in such an event, data line 20 may be charged to a logic zero voltage through the circuit path from storage node 75 through transistor 50, thence to write data line 22 onto data line 20.

If a logic one had been stored at storage node 75, the logic one voltage is applied to control electrode 70G, allowing transistor 70 to conduct. Since transistors 60 and 70 are both conducting, data line 20 will be charged to the logic zero voltage through the path formed from source voltage terminal 30 through the transistors 70 and 60 to read data line 21 and thence to data line 20. Voltage $V_R$ appearing at control electrode 50G may also permit transistor 50 to partly conduct. An undesirable circuit path would thereby be established from source voltage terminal 30 through transistors 70 and 60, thence to read data line 21, to write data line 22, thence through transistor 50, causing a voltage approaching the logic zero voltage to appear at storage node 75. Thus, the state of the stored bit may be overwritten from a logic one to a logic zero. Further, if this unfortuitous event occurs, the voltage so placed at storage node 75 may stop transistor 70 from conducting. To prevent these vexing events, known prior arrangements, such as those mentioned above, require that precise control be exercised of the voltage supplied to select line 10.

In accordance with our invention, the performance of the disclosed circuit is substantially improved by making the threshold voltage of transistor 50 greater than the threshold voltage of transistor 60. The control requirements placed upon the select line voltage source supplying the select line signal to select line 10 can thereby be substantially reduced. Since the operating margin is equal to the threshold voltage of transistor 50, increased overdrive of the read select voltage is feasible. The faster voltage rise time, typically concomitant with larger overdrive, allows quicker access to the stored information. Also the possible elmination of partial conduction of transistor 50 during the read cycle, resulting from the larger operating margin, supermounts the overwrite problem.

Further memory cell performance improvement is achieved according to the principles of our invention by selectively providing external circuitry transistors, such as an inverter transistor connected to read data line 21, with a threshold voltage greater than the threshold voltage of transistor 60. For example, if a logic one is stored at storage node 75, the larger threshold voltage of the inverter transistor advantageously permits quicker access to the stored information inasmuch as its turn-on voltage is decreased.

In silicon gate technology the threshold voltage of an FET can be shifted by various processes including either changing the surface charge or changing the thickness of a control electrode insulator. Herein, the surface charge of a transistor is the charge in the region on or near the surface of a control electrode thereof. For example, if the control electrode insulator is about 1,000 angstroms of silicon dioxide, then for every $1 \times 10^{11}$ atoms per square-centimeters of implanted positive surface charge, the threshold voltage would change about 0.465 volts. Thus, for typical P-channel FETs with a threshold voltage of 1.6 volts, selective ion implantation of about $6.9 \times 10^{11}$ atoms per square-centimeters will shift the threshold voltage to about 4.8 volts. On the other hand, silicon gate devices with bulk donor concentration of about $1 \times 10^{15}$ atoms per cubic-centimeters typically show a threshold voltage shift of about 1.0 to 1.5 millivolts for every angstrom increase in control electrode oxide thickness. Thus, typical P-channel silicon control electrode devices with a threshold voltage of about 1.6 volts have a control electrode oxide thickness of about 1,000 angstroms. Assuming one millivolt per angstrom increase, selective oxidation to about 4,200 angstroms will selectively shift the threshold voltage to about 4.8 volts. Thus, it is clear that the threshold voltage of an FET may be readily controlled during fabrication by ion implantation or by gate oxidation. See, for example, W. M. Carr and J. P. Mize, *MOS/LSI Design and Application*, (New York: McGraw-Hill Book Co., Inc. 1972), pp 61–81 or A. S. Grove, *Physics and Technology of Semiconductor Devices*, (New York: John Wiley and Sons, Inc., 1967), Chapters 9, 11.

Although the invention has been described and illustrated in detail with reference to a specific memory cell configuration, it is to be understood that the same is by way of illustration only, and is not taken by way of limitation. For example, our invention may be employed to advantage in other memory cell configurations using multilevel signals on a single select line for selecting between the various cell states. Thus, the spirit and scope of our invention are limited only by the terms of the appended claims.

We claim:

1. In a three transistor dynamic memory cell of the type including a storage transistor connected in series between a read transistor and a voltage potential terminal, said read transistor being connected in series between said storage transistor and a read data line, a write transistor connected between a write data line and a control electrode of said storage transistor, and a single select line connected in common to respective control electrodes of said write and read transistors, the improvement comprising means responsive to different level signals on said select line for selecting between said write and said read transistors, respectively, said selecting means including said write transistor having permanently different threshold voltage than said read transistor.

2. The cell defined in claim 1 wherein said read data line and said write data line are connected in common.

3. The cell defined by claim 1 wherein said write and read transistors are field effect transistors, and said selecting means comprises each of said write and read transistors having a different surface charge in the region of said respective control electrodes.

4. The cell defined by claim 1 wherein said write and read transistors are field effect transistors, and said selecting means comprises each of said respective control electrodes having a different insulator thickness.

5. A memory cell comprising:

a first, a second, and a third field effect transistor, each having a predetermined threshold voltage and each having at least one control electrode and at least two other terminals, a first and a second data line, means for connecting said first transistor serially between said data line and said second transistor, a first and a second potential terminal, means for connecting asid second transistor serially between said first transistor and said first potential terminal, means for connecting said third transistor between said second data line and said one control electrode of said second transistor, the connection between said second and third transistors defining a storage node, a select line, means for connecting said select line jointly to said one control electrode of each of said first and third transistors, means for storing information between said second potential terminal and said storage node, and means for providing said first and third transistors with permanently different predetermined threshold voltages such that said threshold voltage of said third transistor is greater than said threshold voltage of said first transistor during the storing of information between said second potential terminal and said storage node.

6. The cell defined in claim 5 further comprising a substrate supporting the cell, said substrate connected to said second potential terminal, and said storing means comprises parasitic capacitance between said substrate and said storage node.

7. The memory cell defined in claim 5, wherein said providing means comprises a predetermined surface charge in the region of said one control electrode of said third transistor greater than the surface charge in the region of said one control electrode of said first transistor.

8. The memory cell defined in claim 5 wherein said providing means comprises a predetermined thickness of insulator material in the region of said one control electrode of said third transistor greater than the thickness of the insulator material in the region of said one control electrode of said first transistor.

9. The memory cell defined in claim 5 further comprising:

a third data line, and means for jointly connecting said first and second data lines to said third data line.

* * * * *